(12) United States Patent
Barthel et al.

(10) Patent No.: US 7,640,480 B2
(45) Date of Patent: Dec. 29, 2009

(54) DETECTION OF ERRORS IN THE COMMUNICATION OF DATA

(75) Inventors: Herbert Barthel, Herzogenaurach (DE); Georg Haller, Erlangen (DE); Rainer Mattes, Trittenheim (DE); Thomas Peter, Ammerthal (DE); Wolfgang Schmauss, Rückersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 625 days.

(21) Appl. No.: 11/397,510

(22) Filed: Apr. 4, 2006

(65) Prior Publication Data

US 2006/0242535 A1 Oct. 26, 2006

(30) Foreign Application Priority Data

Apr. 6, 2005 (EP) .................................. 05007518

(51) Int. Cl.
*H03M 13/00* (2006.01)
(52) U.S. Cl. ..................... 714/763; 711/162; 714/758; 714/757
(58) Field of Classification Search ................... 714/758
See application file for complete search history.

(56) References Cited

U.S. PATENT DOCUMENTS 6,282,691 B1 8/2001 Sakata
6,697,490 B1 * 2/2004 Mizikovsky et al. ........ 380/262
6,959,384 B1 * 10/2005 Serret-Avila ................ 713/176

(Continued)

FOREIGN PATENT DOCUMENTS

DE 198 33 867 A1 2/2000
EP 1 596 517 11/2005
WO WO 02/39593 A2 5/2002

OTHER PUBLICATIONS

MacWilliams et al., "The Theory of Error-Correcting Codes", 1977, pp. 1-9 North-Holland, New York, XP00790336, ISBN: 0444851933.
F. J. MacWilliams and N.J.A. Sloane, "The Theory of Error-Correcting Codes", North-Holland, New York, 1977, pp. 567-571, XP 002348328.

* cited by examiner

*Primary Examiner*—M. Mujtaba K Chaudry
*Assistant Examiner*—Enam Ahmed

(57) ABSTRACT

The invention relates to a method and a system for detecting errors in the communication of data from a transmitter to at least one receiver. In the method, in a first step on the side of the transmitter a first check value is generated at least from user data to be communicated; in a second step on the side of the transmitter a second check value is generated at least from the user data and the first check value; in a third step at least the user data, the first check value and the second check value are communicated to the receiver; in a fourth step on the side of the receiver the communicated user data and the communicated first check value are verified with the aid of the second check value; and in a fifth step on the side of the receiver the communicated user data are verified with the aid of the first check value. To improve the detection of errors in the communication of data from the transmitter to the at least one receiver it is proposed that, in the first step, the user data are modified to generate the first check value, in the second step the unmodified user data are used to generate the second check value, in the fourth step the unmodified communicated user data are used, and in the fifth step the communicated user data are modified according to the modification in the first step for checking with the aid of the first check value.

18 Claims, 9 Drawing Sheets

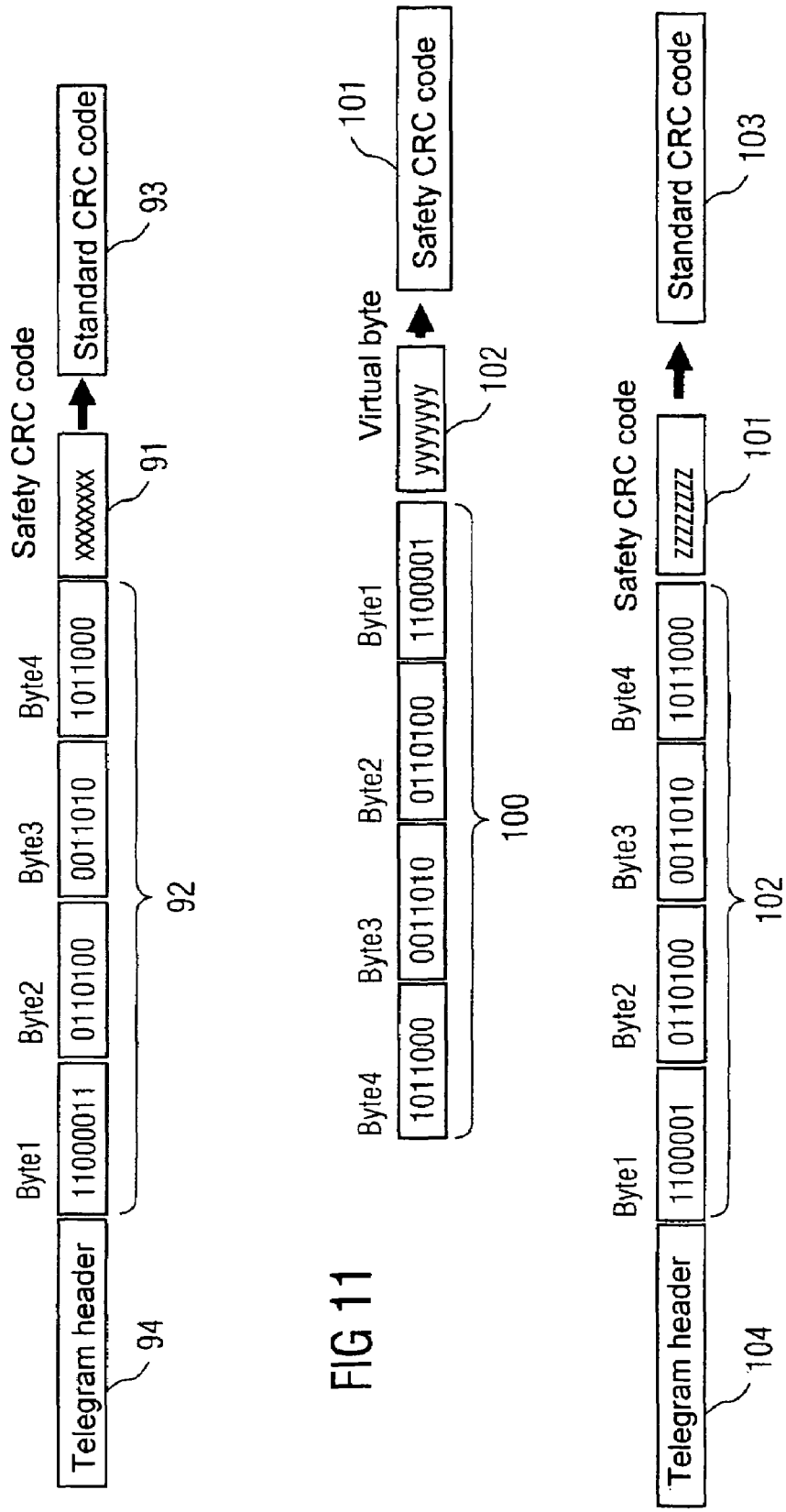

DETECTION OF ERRORS IN THE COMMUNICATION OF DATA

CROSS REFERENCE TO RELATED APPLICATIONS

This application claims priority to the European application No. EP05007518.3, filed Apr. 6, 2005 which is incorporated by reference herein in its entirety.

FIELD OF INVENTION

The invention relates to a method and a system for detecting errors in the communication of data from a transmitter to at least one receiver. In a first step of this method, on the transmitter side a first check value is generated at least from user data to be communicated; in a second step on the transmitter side a second check value is generated at least from the user data and the first check value; in a third step at least the user data, the first check value and the second check value are communicated to the receiver; in a fourth step on the receiver side the communicated user data and the communicated first check value are verified with the aid of the second check value; and in a fifth step on the receiver side the communicated user data is verified with the aid of the first check value.

BACKGROUND OF INVENTION

In failsafe systems in particular, e.g. in industrial automation equipment, errors of all types must be detected with a high degree of probability and must be controlled such that, from the safety engineering perspective, they do not initiate an unacceptable response but at most a failsafe response. In such systems this applies especially to communication, e.g. via field buses. Communication in known field bus systems is conventionally set up according to the ISO/OSI model, that is to say, a distinction is made between different layers of communication, from the physical layer at the lowest level to the application layer at the highest level. With the known failsafe profile Profisafe, which is an extension of the known industry standard Profibus, communication is achieved with the requisite safety especially by the addition of a further failsafe layer known as the safety layer to the known ISO/OSI layers. This failsafe layer incorporates components of the communication system that is critical with regard to safety, e.g. addressing, watchdog timers, sequential control, signature, etc. Also in this safety layer of communication, a check value, e.g. what is known as a cyclic redundancy check (CRC) value, is generated using the data to be communicated. The purpose of this check value is to detect errors with the required probability. Thus, for example, a residual error rate for safety applications of less than $10^{-9}$ per hour can be guaranteed. The use of a check value serves to guarantee data integrity in data communication or data storage. Thus a value, in the simplest case a checksum, is determined from data of a message with a suitable method, e.g. is calculated. The resultant value is then co-stored or co-transmitted as a check value. The receiver of the message can likewise determine a check value from the data and can compare the said value with the co-transmitted check value of the transmitter. If the two check values are different, there is an error, especially a transmission error. If the two check values are identical, then there is a high degree of probability that the message has been correctly transmitted.

SUMMARY OF INVENTION

The check value generated on the transmitter side in the safety layer is likewise used on the receiver side in the safety layer to check correct transmission of the data. However, communication also takes place over the standard layers of the ISO/OSI model. In these standard layers, usually in layer 2, a check value is also generated according to a scheme similar to that in the safety layer. With the same type of check value generation in the safety layer and the standard layer, the residual error probability achievable does not, however, decrease by comparison with the generation of a single check value, since the same type of check value generation leads only to the detection of identical bit errors.

This is explained in more detail below by means of two examples of check value generation using a CRC. In a first example of this, the safety-related data is monitored for correctness in the safety layer by means of a CRC. The CRC value is generated by the data transmitter and checked by the data receiver. The safety layer uses the standard layers (e.g. Ethernet, CAN bus, etc.) for communication, especially to achieve the required availability. In the standard layers (usually in layer 2) there is also a CRC according to the same scheme as in the safety layer, although this standard layer uses a different CRC polynomial from the safety layer and different divisors from the CRC polynomial of the safety layer.

According to a second example, the safety-related data is again monitored for correctness in the safety layer using a CRC. The CRC value is generated by the data transmitter and checked by the data receiver. For communication the safety layer uses the standard layers, e.g. any communications bus, wired or wireless, especially to achieve the availability required in each case. In the standard layers (e.g. layers 2 and 3) there is a CRC according to the same scheme as in the safety layer. In this case, the standard layer uses the same CRC polynomial as the safety layer and/or the same divisor as the CRC polynomial of the safety layer. In this case (that is to say with the same polynomial), the residual error rate in specific bit error spans is, however, just $10^{-5}$ per hour, which is unacceptable for most safety engineering applications. The reason for this is that all or many errors which the standard CRC does not detect (the residual error rate of a CRC of checked suitability is $<=2^{-r}$, where r=bit length of the CRC polynomial) are then likewise not detected by the CRC of the safety layer.

Where different generator polynomials are used, significantly improved error detection is therefore guaranteed. To establish this improved error detection, verification could be carried out to check whether, in the standard layers, the same CRC polynomial is used as in the safety layer and whether the CRC polynomial of the standard layers uses the same divisor as the CRC polynomial of the safety layer. This check is complex, however, since the divisors have to be tested for each polynomial division. Nevertheless, this check has been in more or less constant use until now for safety applications because, if it emerges that the generator polynomial (=CRC polynomial) and/or the divisor of the CRC polynomial of the safety layer is used in the standard layer, then this standard layer cannot be used together with the generator polynomial of the safety layer. Until now either the parameters of the CRC have been verified for each subimposed bus used (standard layer), as required in railway engineering for example, or a sufficiently large CRC polynomial is used in the safety layer (e.g. a 64-bit polynomial instead of a 16-bit or 24-bit polynomial, which would actually suffice).

An object of the invention is to improve the detection of errors in the communication of data from a transmitter to at least one receiver.

This object is achieved by virtue of a method for detecting errors in the communication of data from a transmitter to at least one receiver, in which method in a first step on the transmitter side a first check value is generated at least from user data to be communicated, in a second step on the transmitter side a second check value is generated at least from the user data and the first check value, in a third step at least the user data, the first check value and the second check value are communicated to the receiver, in a fourth step on the receiver side the communicate d user data and the communicated first check value are verified with the aid of the second check value, and in a fifth step on the receiver side the communicated user data is verified with the aid of the first check value, in the first step the user data being modified to generate the first check value, in the second step the unmodified user data being used to generate the second check value, in the fourth step the unmodified communicated user data being used, and in the fifth step the communicated user data being modified according to the modification in the first step for checking with the aid of the first check value.

This object is achieved by virtue of a system for detecting errors in the communication of data from a transmitter to at least one receiver, the transmitter having first means for generating a first-check value at least from user data to be communicated and having second means for generating a second check value at least from the user data and the first check value, transmission means being provided for communicating at least the user data, the first check value and the second check value to the receiver, the receiver having first check means for verifying the communicated user data and the communicated first check value with the aid of the second check value, and having second means for verifying the communicated user data with the aid of the first check value, there being provided in the transmitter third means for modifying the user data to generate the first check value, and there being provided in the receiver fourth means for modifying the communicated user data according to the modification with the third means, for verification with the aid of the first check value.

The invention is based on the concept that the generation of the first check value takes place on the basis of modified user data, whereas the generation of the second check value takes place on the basis of the unmodified user data, or vice versa. The modification of the user data is a modification relative to the user data to be transmitted by the transmitter to the receiver. On the receiver side, the type of modification of the user data on the transmitter side is known and is accordingly taken into account when the verification is carried out in the fifth step with the aid of the first check value, that is to say, the user data is modified before or for verification in the fifth step in the same way as in the first step. Generation of the second check value, e.g. in a standard layer, takes place without knowledge of the data modification carried out when the first check value is generated. The method according to the invention thus now dispenses with the need to test the generation of the first or second check value with respect to the generation algorithm. Even with an identical generation algorithm, the second check value differs from the first check value. When applied in the examples referred to above, the second check value generated in the standard layer is thus guaranteed to be different from the first check value generated in the safety layer, even if they use the same generator polynomial or even if a divisor of the polynomial of the safety layer is present in the generator polynomial of the standard layer. Ultimately, any arbitrary generation algorithm in the first step and fifth step also detects different errors from the generation algorithm in the second step and fourth step of the method.

According to an advantageous development of the invention, the modification of the user data in the first step and fifth step is carried out by expanding the user data. Such an expansion is especially easy to achieve. This expansion is, however, not part of the user data when the second check value is generated and is not part of the data transmitted to the receiver. Nevertheless, the type of expansion is known on the receiver side and is taken into account when verification is carried out in the fifth step.

According to a further advantageous development of the invention, the modification of the user data in the first step and fifth step is carried out by rearranging the user data. This is considered to be the safest and, in this respect, best way of achieving the most independent check value generation possible in the first step and second step. In the first step, the user data is thus rearranged prior to the generation of the first check value and are rearranged in the same way in the fifth step prior to verification.

A further way of modifying the user data, according to a further advantageous development of the invention, consists in the modification of the user data in the first step and fifth step by at least partially inverting the user data.

According to a further advantageous development of the invention, a cyclic redundancy check is carried out to generate the first check value in the first step and/or to generate the second check value in the second step. A cyclic redundancy check, abbreviated to CRC, is a method for determining a check value for data to enable errors in the transmission of the data to be detected. CRC values are calculated prior to the start of the transmission and after completion of the transmission. The two check values are then compared. CRCs are designed so that predictable errors such as might arise as a result of noise on the line, for example, can almost always be detected. A CRC polynomial is comparable to a prime number, and the generation algorithm is comparable to the division of the data by this prime number. The remainder of the division corresponds to the CRC result. Any errors that generate the same remainder are not therefore detected. CRC generation is thus equivalent to polynomial division where the division remainder is used as a check value.

According to a further advantageous development, the invention enables, in particular, an identical generation algorithm to be used to generate the first check value in the first step and to generate the second check value in the second step. Here, despite identical generation algorithms, the error detection rate is increased by comparison with the us e of a single check value generation process.

Advantageously, depending on the result of the verification in the fourth step and fifth step, there is a failsafe response. Failsafe means that, in the event of failure or an error, the system enters a safe state as a result of the failsafe response.

According to a further advantageous development of the invention, the method is used for communication within a failsafe system. In a failsafe system, all the errors occurring in the system (in this case errors that can occur in communication) must be detected with a sufficiently high degree of probability and must be controlled in order adequately to reduce the threat to man, environment and/or machine posed by errors in the system.

Since the proposed method and system especially also support safe communication over non-safe communication channels, according to a further advantageous development of the invention it is proposed that the data is communicated via at least one field bus system.

BRIEF DESCRIPTION OF THE DRAWINGS

The invention is described in more detail and explained below with reference to the exemplary embodiments shown in the figures, where:

FIG. 10 shows an exemplary embodiment of the invention in which the modification of the user data in the first step and fifth step is carried out by byte-oriented rearrangement of the user data; and FIG. 11 shows an exemplary embodiment of the invention in which, in addition to the reversal of the byte arrangement of the user data, a virtual byte is added when the first check value is generated.

DETAILED DESCRIPTION OF INVENTION

Figure 1:
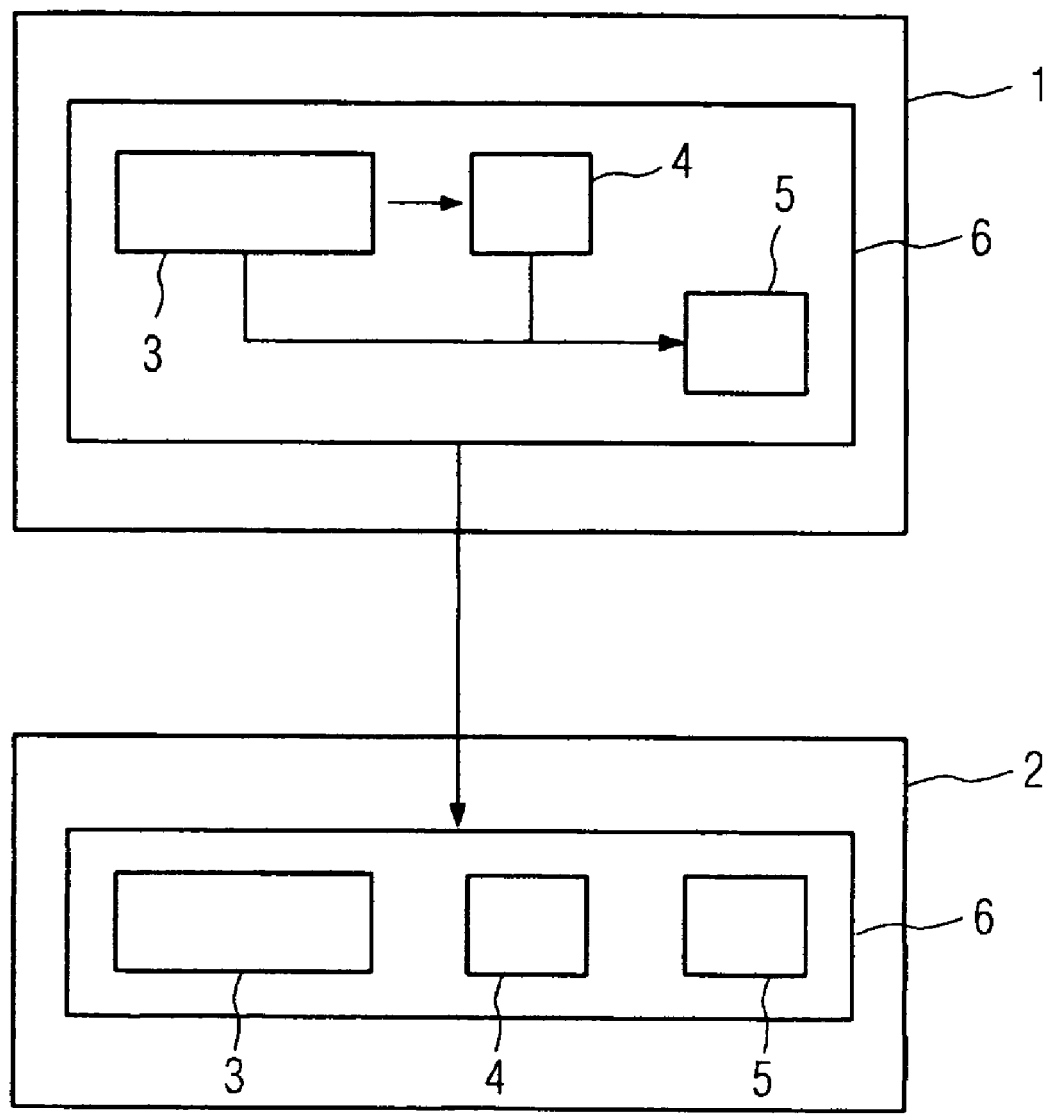
FIG. 1 shows a system for detecting errors in the communication of data from a transmitter to a receiver.

FIG. 1 shows a system for detecting errors in the communication of data from a transmitter 1 to at least one receiver 2. On the side of the transmitter 1 a first check value 4 is generated at least from the user data 3 to be communicated. In a second step, on the side of the transmitter 1 a second check value 5 is generated at least from the user data 3 and the first check value 4. The user data 3, the first check value 4 and the second check value 5 are communicated to the receiver 2 inside a message 6. In a fourth step, on the side of the receiver 2 the communicated user data 3 and the communicated first check value 4 are verified with the aid of the second check value 5. In a fifth step, on the side of the receiver 2 the communicated user data 3 are verified with the aid of the first check value 4.

Figure 2:
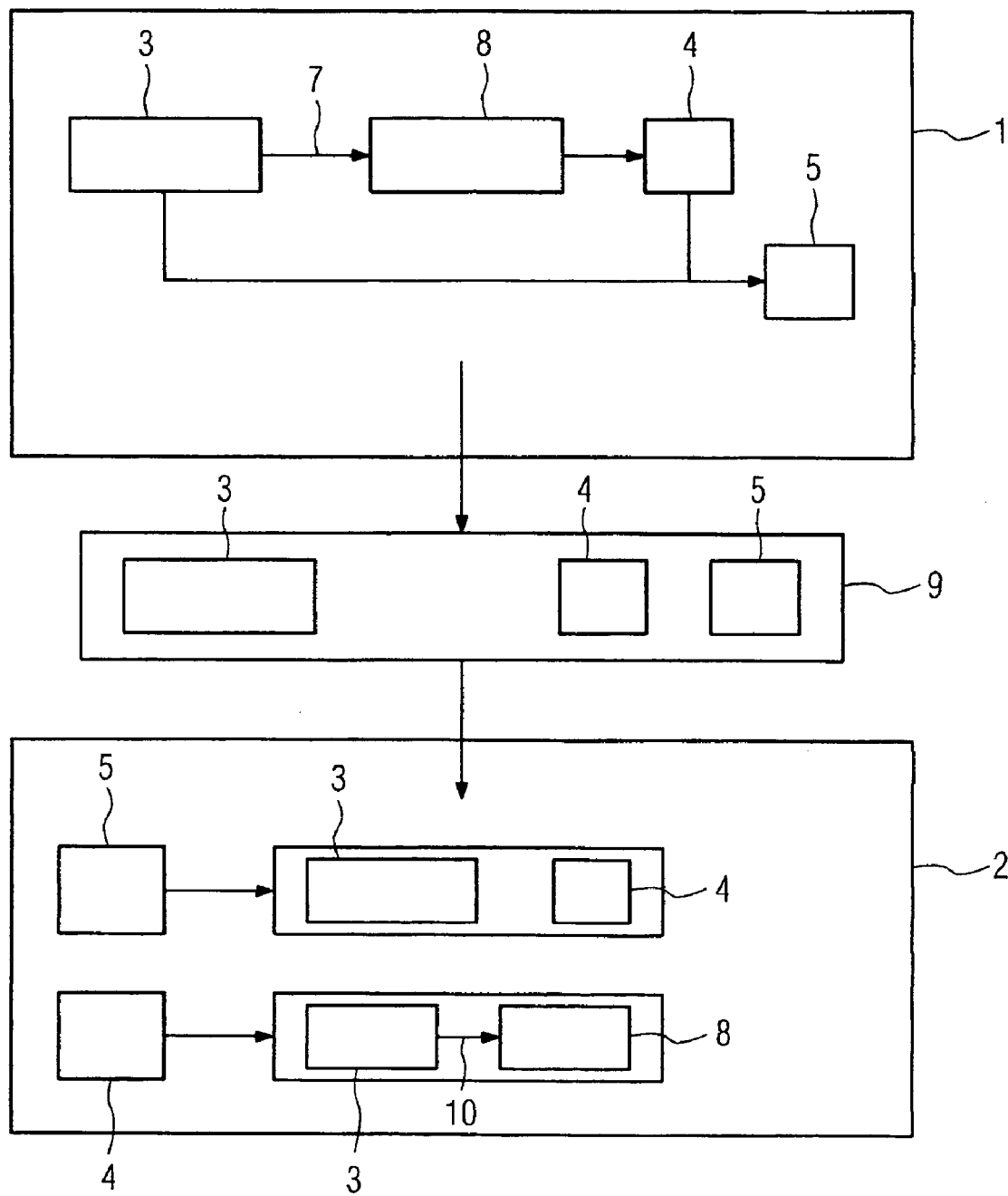
FIG. 2 shows a further system for detecting errors in the communication of data from a transmitter to a receiver.

FIG. 2 shows a system for detecting errors in the communication of data 3, 4, 5 from a transmitter 1 to a receiver 2. The transmitter 1 has first means for generating a first check value 4 from the user data 3 to be communicated and has second means for generating a second check value 5 from the user data 3 and the first check value 4. In addition, the transmitter 1 has third means 7 for modifying the user data 3 into modified user data 8, which are provided for the generation of the first check value 4, that is to say are used in the generation of the first check value 4. The data 3, 4, 5 are transmitted in the form of a message 9 to the receiver 2 with transmission means. The receiver 2 has first check means for verifying the communicated user data 3 and the communicated first check value 4 with the aid of the second check value 5, and the said receiver has second means for verifying the communicated user data 3 with the aid of the first check value 4. In addition, the receiver 2 has fourth means 10 for modifying the communicated user data 3 into modified user data 8 according to the modification with the third means 7, for verification with the aid of the first check value 4.

Figure 3:
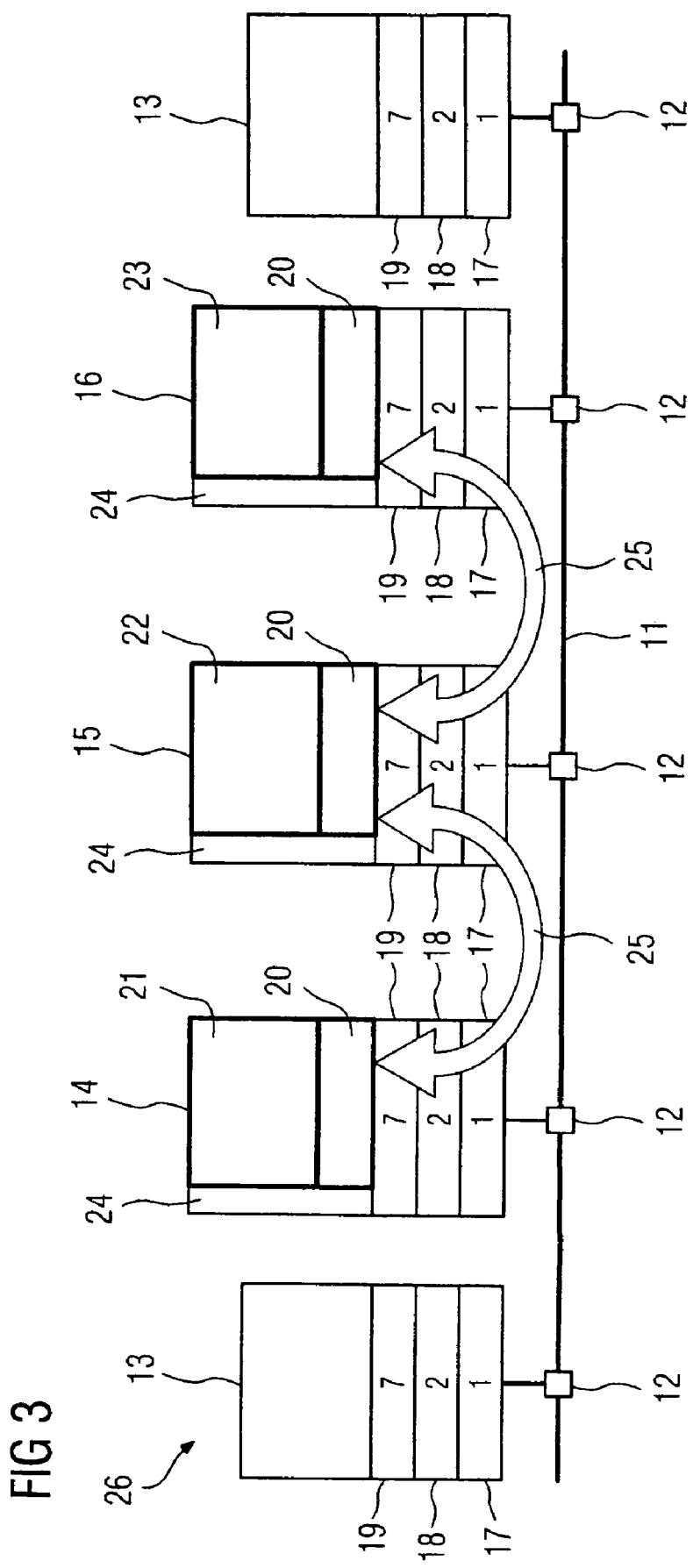
FIG. 3 is a diagrammatic view of the different layers of communication in a communication network.

FIG. 3 illustrates failsafe communication using what is known as the layered model, in this case based on the ISO/OSI layered model. FIG. 3 shows a failsafe system 26. A layered model describes, in the form of logical self-contained layers, how communication in a network is structured. In this case the communication model for non-failsafe communication has seven layers, of which three layers are shown as an example in FIG. 3. These non-failsafe layers 17, 18, 19, also referred to as a black channel, comprise non-failsafe components such as ASICs, links, cables and the like. Shown here are the lowest two layers 17, 18 and the uppermost layer of non-failsafe communication 19. The subimposed non-failsafe communication has the necessary means for achieving the availability required in the particular application. That is to say, the non-failsafe layers establish the availability of communication required in the particular case. In the failsafe communication layer, also referred to as the safety layer 20, which is, for example, configured with redundancy, the required safety (e.g. residual error rate less than $10^{-9}$ per hour) is achieved, that is to say, the required additional characteristics for an especially high level of safety are achieved here by the safety layer 20, e.g. Profi safe. The safety layer 20 makes available failsafe functions, e.g. with respect to addressing, watchdog timers, sequencing, signature, etc. According to the exemplary embodiment in FIG. 3, the communication means are designed as part of standard input/output modules 13 and of a failsafe input module 14, a failsafe controller 15 and a failsafe output module 16. The communication means communicate via point-to-point connections 11 and via thereby connected switches 12. The failsafe communication is symbolized by the arrows 25. Onto the failsafe communication layer 20 there are positioned failsafe applications 21-23 which are themselves not, however, part of the profile of the failsafe communication layer. Functions 24 not relevant to the failsafe functions are positioned directly onto the non-failsafe communication layers 17-19. Non-failsafe functions of this kind relate, for example, to diagnosis. The failsafe communication layer performs failsafe functions such as check value determination, message counting and synchronization.

In the exemplary embodiment of the invention shown in FIG. 3, a CRC value is generated via the data in the safety layer 20 of communication. The purpose of this value is to detect errors with the required probability. Or, in other words, to guarantee a residual error rate, e.g. for safety applications, of less than $10^{-9}$ per hour in order to comply with, for example, the acceptable limits for SIL3 in IEC 61505. With the proposed method, when the safety layer is used it is no longer necessary to test the standard layers with respect to the data link algorithm used there. There is therefore no need to test which CRC polynomials are used in the data link layers of the standard layer and whether these polynomials use divisors of the CRC of the safety layer. A further advantage is that the use of this invention obviates the need for the requirement that a safety layer can be used only with a "tested" standard layer, since any standard layers can be used. With the application of this invention, requirements R17 and R18 of IEC 62280-1 are automatically satisfied for all standard buses (=non-trusted transmission system).

The above-mentioned first check value corresponds to the check value generated in the safety layer, and the above-mentioned second check value corresponds to the check value generated in a standard layer.

Figure 4:
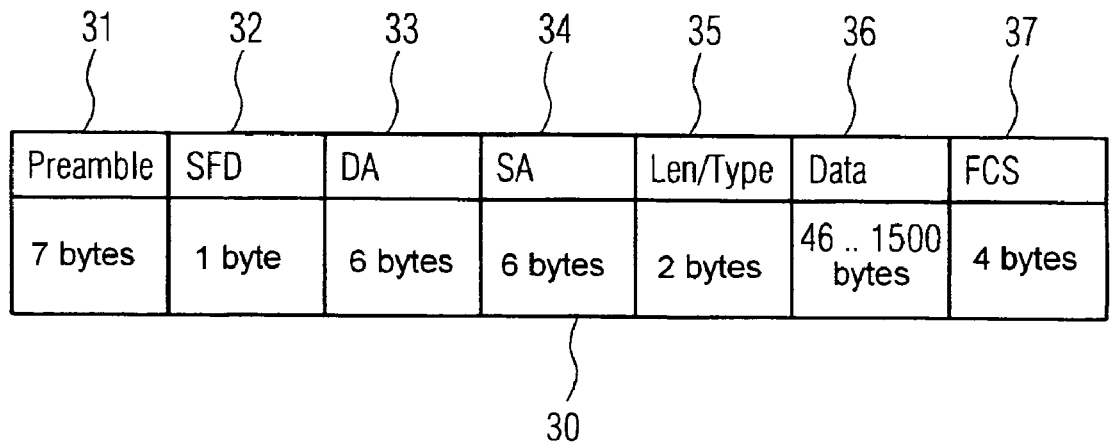
FIG. 4 shows the structure of a standard Ethernet message.

FIG. 4 shows the structure of a standard Ethernet message. The standard Ethernet message 30 has a Preamble 31 with a length of 7 bytes incorporating a 10101010 . . . combination. The following Start Frame Delimiter 32 (abbreviated to SFD) has 1 byte with the bits 10101011. The Destination Address 33, abbreviated to DA, contains the Ethernet address of the receiver and usually has 6 bytes. The following Source Address 34, abbreviated to SA, contains the Ethernet address of the transmitter and usually has a length of 6 bytes. Len 35 contains, in conformity with the standard IEEE 802.3, the Length or Ether Type of the following data field, and has a length of 2 bytes. The following data field Data 36 contains the user data, which can usually have a length of between 46 and 1500 bytes. The part of the message 30 following the user data is referred to as FCS 37 (FCS=Frame Check Sequence) and contains the checksums of the data transmitted, i.e. DA, SA, Len, Data. Here the FCS is a 32-bit CRC value.

Figure 5:
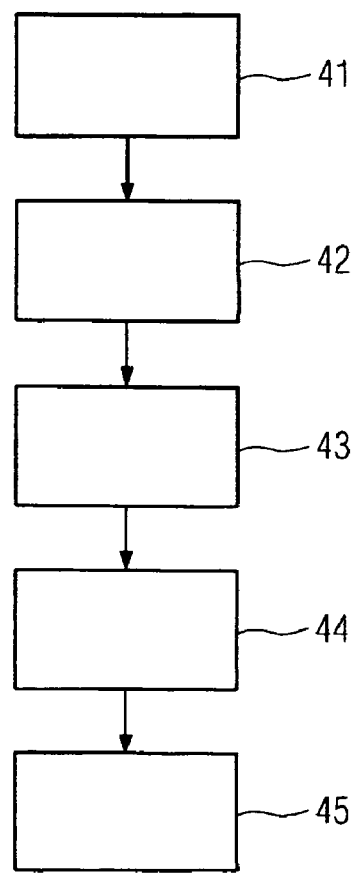
FIG. 5 shows the individual steps of a method for detecting errors in the communication of data from a transmitter to at least one receiver.

FIG. 5 illustrates the individual steps of the method for detecting errors in the communication of data 3, 4, 5 from a transmitter 1 to at least one receiver 2. The five successive steps 41 to 45 are shown. In the first step 41, on the side of the transmitter 1 a first check value 4 is generated at least from user data 3 to be communicated, the user data 3 being modified to generate the first check value 4. In the second step 42, on the side of the transmitter 1 a second check value 5 is generated at least from the user data 3 and the first check value 4, the unmodified user data 3 being used to generate the second check value 5. In the third step 43, at least the unmodified user data 3, the first check value 4 and the second check value 5 are communicated to the receiver 2. In the fourth step 44, on the side of the receiver 2 the communicated user data 3 and the communicated first check value 4 are verified with the aid of the second check value 5. In the fifth step 45, on the side of the receiver 2 the communicated user data 3 are verified with the aid of the first check value 4, the communicated user data 3 being modified according to the modification in the first step 41, for verification with the aid of the first check value 4.

Figure 6:
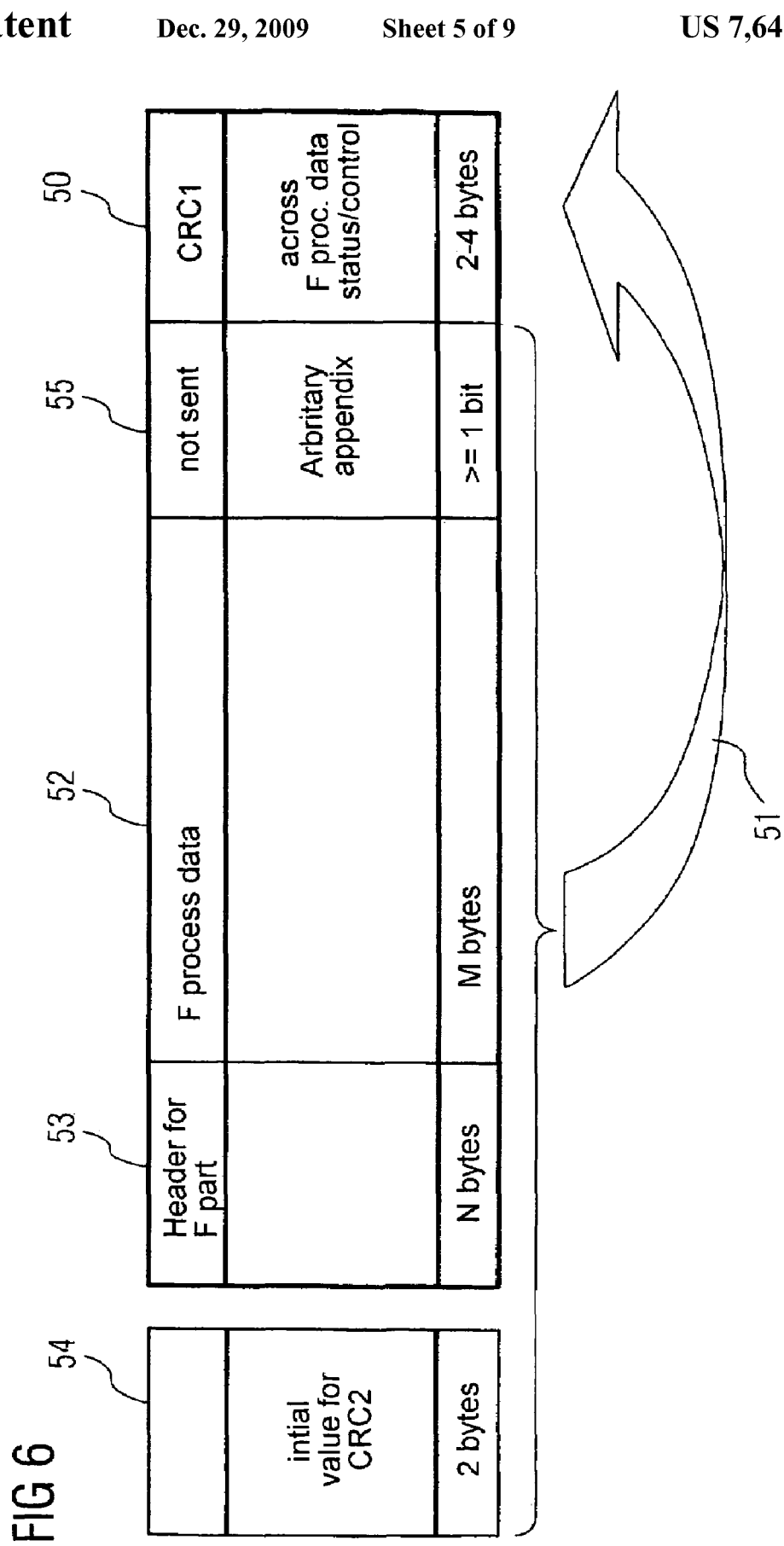
FIG. 6 shows an exemplary embodiment of the invention in which the modification of the user data in the first step and fifth step is carried out by expanding the user data.

FIG. 6 shows an exemplary embodiment of the invention in which the modification of the user data in the first step and fifth step is carried out by expanding the user data. FIG. 6 shows the generation of the check value 50. The means for generating the check value 50 are indicated by the arrow 51. The check value 50 is generated from the user data proper 52 and from a header for the failsafe part 53, 50 and an initial value 54 for calculation of the check value. In addition to these data, the user data 52 are expanded by an arbitrary appendix of at least 1 bit in length 55. The arbitrary appendix 55 is therefore included in the calculation of the check value 50. There is thus appended before the check value, e.g. the CRC value, or after the data to be safeguarded at least one bit which has the same state in the transmitter and receiver and which is included in the generation of the safety check value but is not transmitted (see FIG. 7). In other words, there is inserted into the area to be safeguarded by means of the check value, in the last position, data (at least 1 bit) which is known to the transmitter and the receiver for check value generation. This data is not, however, part of the safety layer message to be transmitted.

Figure 7:
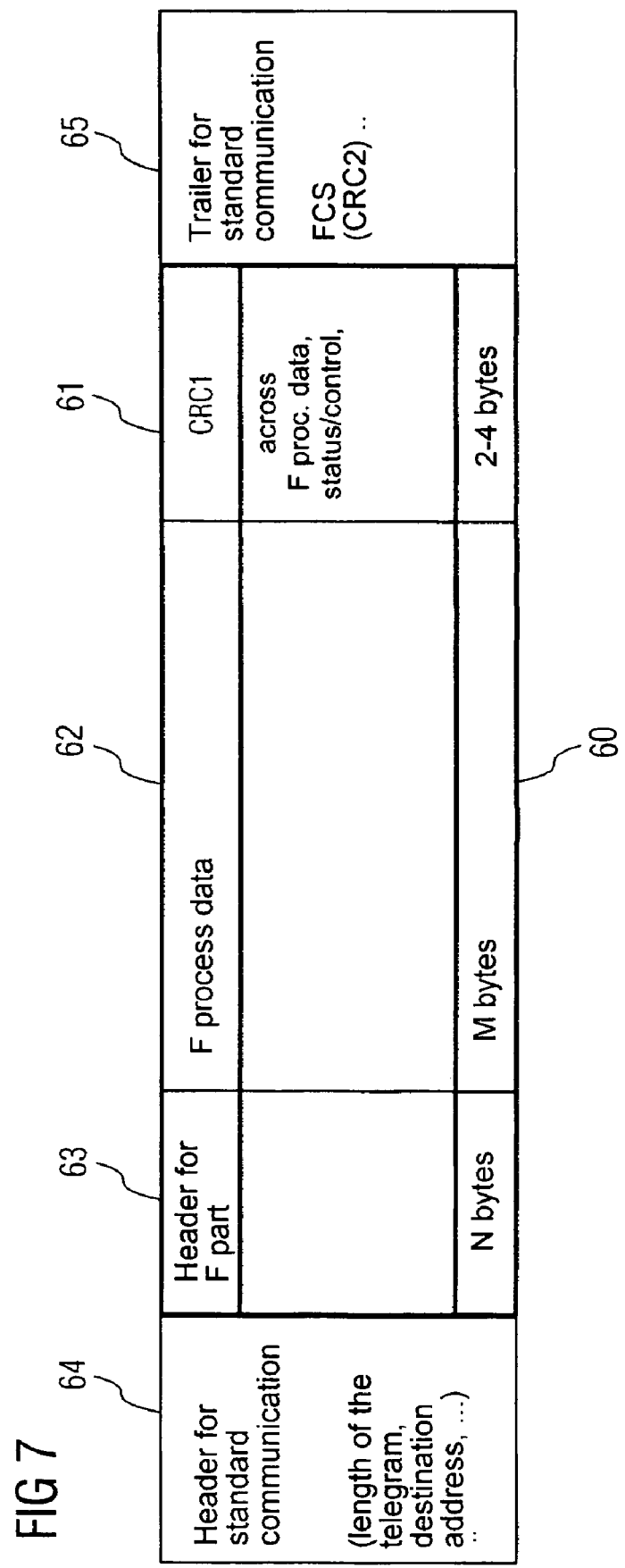
FIG. 7 shows the message communicated to the receiver in question in this case.

FIG. 7 shows the message 60 communicated to the receiver in question. The appendix 55 used in the generation of the check value 50 is not co-transmitted with the communicated message 60. The message 60 therefore consists only of the user data 62, the header 63 for the failsafe part, the check value 61, and the standard communication header 64 and trailer 65.

Figure 8:
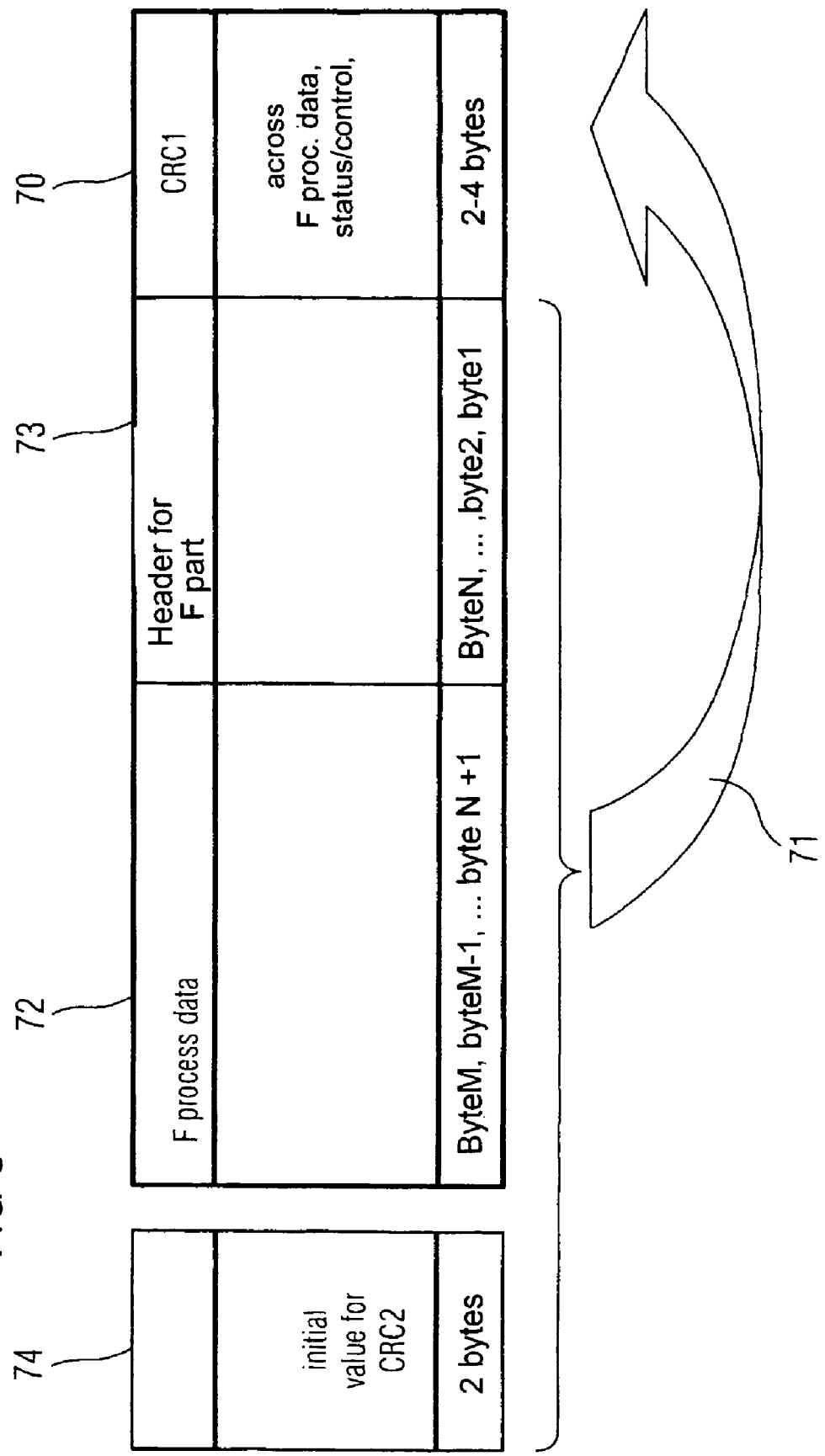
FIG. 8 shows an exemplary embodiment of the invention in which the modification of the user data in the first step and fifth step is carried out by rearranging the user data;.

FIG. 8 shows an exemplary embodiment of the invention in which the modification of the user data in the first step and fifth step is carried out by rearranging the user data. The generation of the first check value 70 in the first step, i.e. in the safety layer, is carried out by means 71. The user data in this case are considered to be the process data proper 72 and the header 73 for the failsafe part. The byte orientation of these user data 72, 73 is reversed to generate the first check value 70. In the bit sequence of the data, the first byte is therefore positioned at the very end and, conversely, the last byte is positioned at the very beginning. In other words, the bit stream is modified. In addition to the user data 72, 73, an initial value 74 with a length of 2 bytes is included for calculation of the first check value 70. The generation algorithm in the safety layer interchanges the bytes prior to the generation of the first check value 70 in the transmitter and in the same way prior to verification in the receiver. The divisibility of the message is thereby rendered independent even with the same generator polynomial in both checks.

Figure 9:
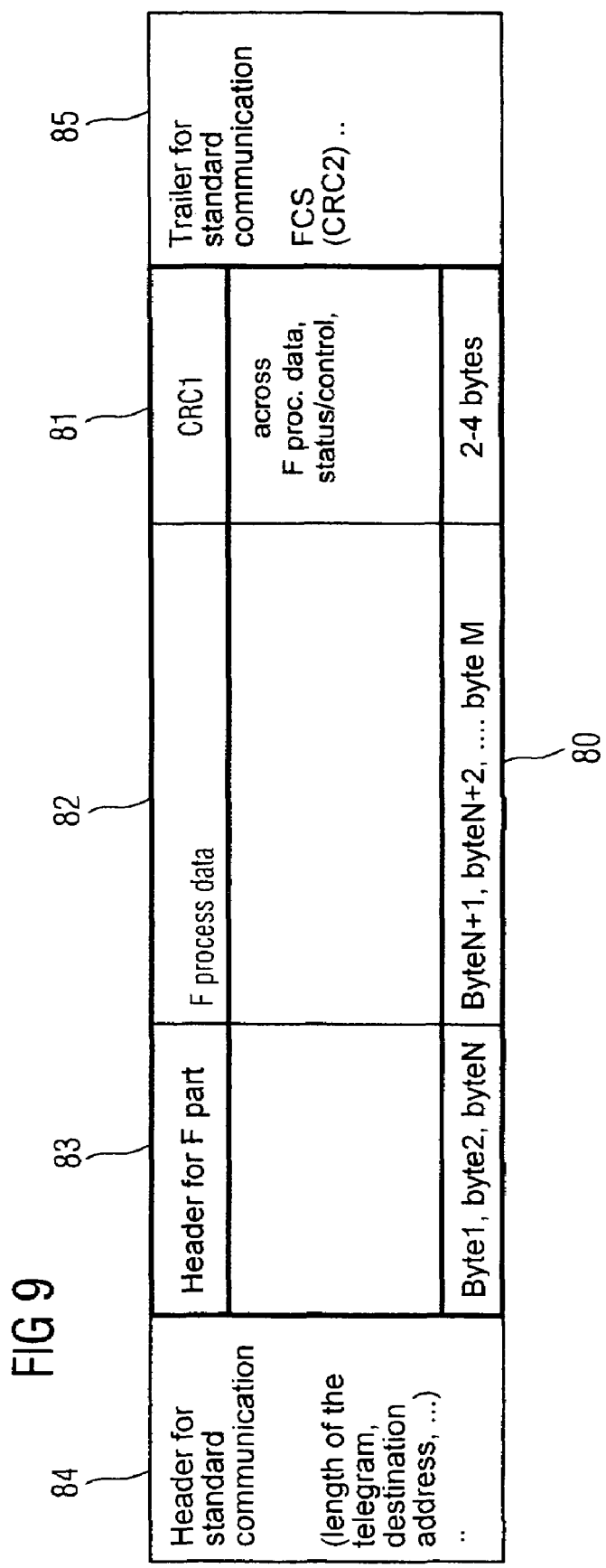
FIG. 9 shows the message communicated by the transmitter to a receiver in this case.

FIG. 9 shows the message 80 communicated by the transmitter to a receiver. In this message 80, the user data 82, 83 are arranged in their original arrangement. The first byte is therefore in the first position of the bit sequence and the last byte is in the last position. The header 83 for the failsafe part is likewise positioned ahead of the failsafe process data proper 82. This arrangement of the user data 82, 83 is likewise used for the calculation of a further check value in the standard communication layer. This further c heck value is usually located in the standard communication trailer 85. At the start of the message 80 there is located the standard communication header 84 which, as explained above, incorporates the length of the message, the destination address, etc.

FIG. 10 shows, in a further exemplary embodiment, the calculation of the check value 91 in the first step of the method for detecting errors in the communication of data. In this case, the user data 90 are taken into account in the reverse byte sequence when the check value 91 is generated. The same user data 90 in the correct byte arrangement is indicated in FIG. 10 with the reference numeral 92. The thus unmodified user data 92 is used with the check value 91, calculated in the first step, and with a message header 94 for calculating the second check value 93 in the second step. Disturbed bits are thus in a different position in the case of failsafe check value generation in the first step than in the case of standard check value generation in the second step. The message header 94, the user data 92, the first check value 91 and the second check value 93 are communicated to the receiver in the message as shown in FIG. 10.

FIG. 11 shows a further exemplary embodiment of the method for detecting errors in the transmission of data. In addition to the reversal of the byte orientation of the user data 100, in this case what is known as a virtual byte 102 is added when the first check value 101 is generated. When the second check value 103 is generated, however, the unmodified user data 102, i.e. in their original byte orientation, and the first check value 101 are taken into account. When communication takes place in the form of a message, the user data 102, the first check value 101 and the second check value 103 are additionally preceded by a message header 104. The message is communicated to a receiver in this way.

Further possible solutions not shown here is the insertion of data between the user data and the first check value, the data not being taken into account when the first check value is generated but being taken into account when the second check value is generated, or the inversion of the user data to generate the first check value.

In summary, the invention therefore relates to a method and a system for detecting errors in the communication of data 3, 4, 5 from a transmitter 1 to at least one receiver 2. In the method, in a first step 41 on the side of the transmitter 1 a first check value 4 is generated at least from user data 3 to be communicated; in a second step 42, on the side of the transmitter 1 a second check value 5 is generated at least from the user data 3 and the first check value 4; in a third step 43, at least the user data 3, the first check value 4 and the second check value 5 are communicated to the receiver 2; in a fourth step 44, on the side of the receiver 2 the communicated user data 3 and the communicated first check value 4 are verified with the aid of the second check value 5; and, in a fifth step 45, on the side of the receiver 2 the communicated user data 3 are verified with the aid of the first check value 4. To improve the detection of errors in the communication of data from the transmitter to the at least one receiver it is proposed that, in the first step 41, the-user data 3 are modified to generate the first check value 4, in the second step 42 the unmodified user data 3 are used to generate the second check value 5, in the fourth step 44 the unmodified communicated user data 3 are used, and in the fifth 45 step the communicated user data 3 are modified according to the modification in the first step 41 for checking with the aid of the first check value 4.

The invention claimed is:

1. A method of detecting errors in a communication of user data from a transmitter to at least one receiver, comprising:
   providing non-modified user data to be communicated;
   modifying the user data according to a modification rule;
   determining a first check value at a transmitter side based on the modified user data;
   determining a second check value at the transmitter side based on the non-modified user data and the first check value;
   transmitting the non-modified user data and the first and second check values to the receiver;
   verifying at a receiver side the transmitted non-modified user data and the first check value using the second check value;
   modifying the transmitted non-modified user-data using the modification rule to form modified received user data; and
   verifying at the receiver side the modified received user data using the first check value.

2. The method according to claim 1, wherein the modification rule includes expanding the non-modified user data and the transmitted non-modified user data respectively.

3. The method according to claim 1, wherein the modification rule includes re-arranging the non-modified user data and the transmitted non-modified user data respectively.

4. The method according to claim 1, wherein the modification rule includes inverting at least part of the non-modified user data and the transmitted non-modified user data respectively.

5. The method according to claim 1, wherein the first or the second check value is determined using a cyclic redundancy check.

6. The method according to claim 1, wherein both the first and second check values are determined using an identical generation algorithm.

7. The method according to claim 1, further comprising executing a security procedure if the verification of the transmitted non-modified user data or the verification of the modified received user data indicates a communication error.

8. The method according to claim 1, wherein the method is implemented in a failsafe system to establish a communication between components of the failsafe system.

9. The method according to claim 1, wherein the non-modified user data and the first and second check values are transmitted to the receiver via at least one field bus.

10. A system for detecting errors in a communication of user data from a transmitter to at least one receiver, comprising:
    a transmitter having a first check unit for generating a first check value based on user data to be communicated and having a second check unit for generating a second check value based on the user data and the first check value;
    a receiver; and
    a transmission channel for transmitting the user data and the first and second check values from the transmitter to the receiver, the receiver having a first check mechanism for verifying the transmitted user data and the transmitted first check value using the second check value and having a second check mechanism for verifying the transmitted user data using the first check value, wherein
    the transmitter includes a data modification algorithm for modifying the user data, wherein the first check value is determined from the modified user data, and
    the receiver includes the data modification algorithm for modifying the transmitted user data, wherein the second check mechanism verifies the modified transmitted user data.

11. The system according to claim 10, wherein the data modification algorithm includes expanding the user data.

12. The system according to claim 10, wherein the data modification algorithm includes re-arranging the user data.

13. The system according to claim 10, wherein the data modification algorithm includes at least partially inverting the user data.

14. The system according to claim 10, wherein the first or the second check unit includes a cyclic redundancy check.

15. The system according to claim 10, wherein the first or the second check unit includes an identical generation algorithm for determining the first and second check values.

16. The system according to claim 10, further comprising a security unit for executing a security procedure if the first or the second check mechanism indicates a communication error.

17. The system according to claim 10, wherein the system is part of a failsafe system having system components, the system establishing a failsafe communication between the system components.

18. The system according to claim 10, further comprising a field bus for transmitting the user data.

* * * * *

UNITED STATES PATENT AND TRADEMARK OFFICE
CERTIFICATE OF CORRECTION

PATENT NO. : 7,640,480 B2 Page 1 of 1
APPLICATION NO. : 11/397510
DATED : December 29, 2009
INVENTOR(S) : Barthel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 894 days.

Signed and Sealed this

Ninth Day of November, 2010

David J. Kappos
*Director of the United States Patent and Trademark Office*